(12) United States Patent
Nizar

(10) Patent No.: US 6,442,698 B2
(45) Date of Patent: *Aug. 27, 2002

(54) METHOD AND APPARATUS FOR POWER MANAGEMENT IN A MEMORY SUBSYSTEM

(75) Inventor: Puthiya K. Nizar, El Dorado Hills, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,565

(22) Filed: Nov. 4, 1998

(51) Int. Cl.[7] .................................................. G06F 1/00
(52) U.S. Cl. ....................................... 713/320; 713/323
(58) Field of Search ................................. 713/320, 323, 713/324, 340

(56) References Cited

U.S. PATENT DOCUMENTS

| | | | | |
|---|---|---|---|---|
| 5,721,860 A | * | 2/1998 | Stolt et al. .................. 395/432 |
| 5,835,435 A | * | 11/1998 | Bogin et al. .................. 365/227 |
| 5,881,016 A | * | 3/1999 | Kenkare et al. ....... 365/230.03 |
| 5,889,714 A | * | 3/1999 | Schumann et al. .......... 365/203 |
| 5,923,829 A | * | 7/1999 | Ishii et al. ...................... 714/7 |
| 6,003,121 A | * | 12/1999 | Wirt ............................ 711/170 |
| 6,038,673 A | * | 3/2000 | Benn et al. .................. 713/323 |

* cited by examiner

Primary Examiner—Peter Wong
Assistant Examiner—Tim Vo
(74) Attorney, Agent, or Firm—Blakely, Sokoloff, Taylor & Zafman LLP

(57) ABSTRACT

According to one embodiment, the present invention discloses a method of managing power in a memory system. The memory system includes a plurality of memory devices. Each one of the memory devices is grouped in a first group or a second group. First, access to a memory device is requested. It is next determined whether the requested memory device is located in the first group. If the requested memory device is not located within the first group, it is determined whether the first group is filled to capacity. If the first group is not filled to capacity, the requested memory device is transferred to the first group. According to a further embodiment, each one of the memory devices grouped into the first group is further grouped in to a first subgroup or a second subgroup.

32 Claims, 8 Drawing Sheets

METHOD AND APPARATUS FOR POWER MANAGEMENT IN A MEMORY SUBSYSTEM

FIELD OF THE INVENTION

The present invention relates to system memory power management in a computer system; more particularly, the present invention relates to power management in memory subsystems.

BACKGROUND OF THE INVENTION

Traditionally, the power generated by memory chips, in particularly, Synchronous Dynamic Random Access Memories (SDRAMs) was of little concern because of the low speeds at which they operate. For example, typical SDRAMs operate at speeds up to 66 Mhz. The power generated by SDRAMs operating at such speeds is relatively low. However, with the increase of the operating speeds of SDRAMs and the advent of the Rambus Dynamic Random Access Memories (RDRAMs), operating speeds have dramatically increased. Presently, SDRAMs are capable of operating at speeds up to 100 Mhz, while RDRAMs operate at clock speeds up to 400 Mhz and transfer rate up to 800 MHz. Memory device operating at such high speed result in a significant amount of power being generated within the device (e.g., on the order of 2.1 watts for RDRAMs). The generation of this magnitude of power may potentially create thermal issues at the memory device.

One current method of remedying the excessive generation of power is by curtailing the bandwidth of a memory. This solution is disadvantageous since it decreases the performance of the memory. Another solution is to use heatsinks and/or cooling fans with memory chips to decrease the heat generated by a memory operating at high speeds. However, this method is disadvantageous because of the cost and amount of space that is consumed by such devices. Therefore, a method and apparatus for managing the power generated by memory chips is desired.

SUMMARY OF THE INVENTION

According to one embodiment, a method of managing power in a memory system is disclosed. The memory system includes multiple memory devices. Each one of the memory devices is grouped in a first group or a second group. First, access to a memory device is requested. It is next determined whether the requested memory device is located in the first group. If the requested memory device is not located within the first group, it is determined whether the first group is filled to capacity. If the first group is not filled to capacity, the requested memory device is transferred to the first group.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION OF THE PRESENT INVENTION

Figure 1:
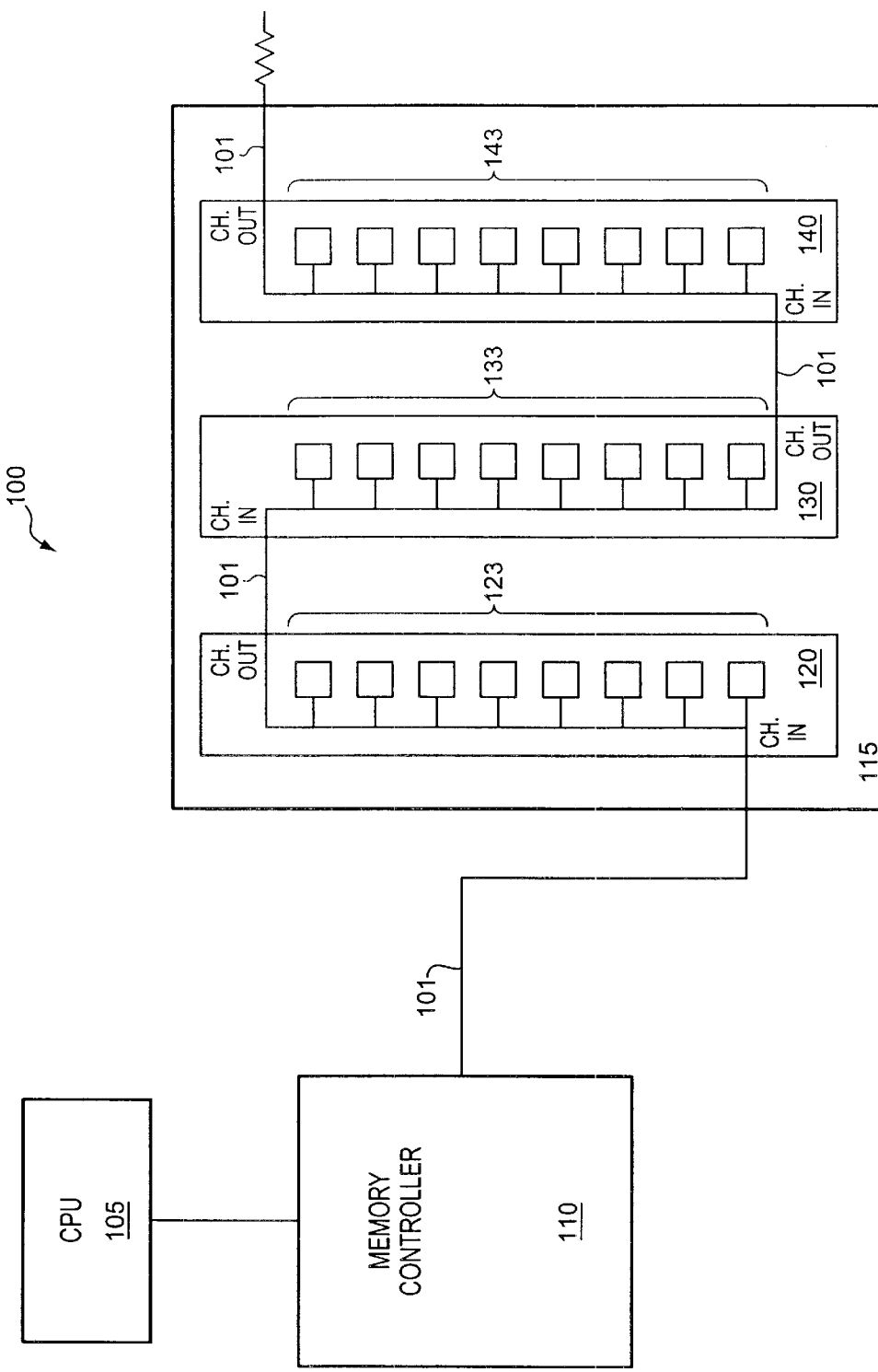
FIG. 1 is a block diagram of one embodiment of a computer system.

FIG. 1 is a block diagram of a computer system 100. Computer system 100 includes a bus 101, a Central Processing Unit (CPU) 105, a memory controller 110 and a memory unit 115. CPU 105 processes information received from memory 115 or other internal and external memory devices of computer system 100. Memory controller 110 is coupled to CPU 105. Further, memory controller 110 interfaces with memory unit 115 in order to carry out memory access transactions.

Memory unit 115 is coupled to memory controller 110 via bus 101. According to one embodiment, memory unit 115 is a Rambus Dynamic Access Memory (RDRAM). Memory unit 115 may be a Direct RDRAM (D-RDRAM) or a Concurrent RDRAM. An RDRAM is a high-speed memory interface that transfers data over a bus called a Rambus Channel. Bus 101 is a Rambus channel that permits memory controller 110 to communicate with memory unit 115. In one embodiment bus 101 is a high speed bus that operates at a clock rate of 400 MHz and enables a data rate of 800 Mhz.

Memory unit 115 includes Rambus In-line Memory Modules (RIMMs) 120, 130 and 140. One of ordinary skill in the art will appreciate that memory unit 115 may include an alternative number of RIMMs. RIMMs 120, 130 and 140 include memory devices 123, 133 and 143, respectively, that are accessed by CPU 105, or other devices coupled to computer system 100, in order to store or read data. Each RIMM includes a channel input and channel output (not shown to avoid obscuring the present invention) that is coupled to bus 101. Bus 101 is coupled to and communicates in parallel with every memory device in each of the RIMMs. Additionally, each memory device within a RIMM operates according to an ACTIVE, STANDBY or NAP state. A memory device is in the ACTIVE state whenever it is ready to transfer, or is actually transferring data. A memory device is in the STANDBY state if the device is not immediately ready to transfer data. A memory device is in the NAP (or sleep) state whenever the device is in a reduced power consumption state which may occur, for example, if the memory device has not been accessed for a long period of time.

Bus 101 is received at the channel input of RIMM 120. Bus 101 is coupled to each of the memory devices 123 within RIMM 120. Bus 101. exits RIMM 120 at the channel output and is received at the channel input of RIMM 130. At RIMM 130, bus 101 is coupled to each memory device 133 before exiting through the output channel. Further, bus 101 is received at RIMM 140 and is coupled to each memory device 143. Finally, bus 101 is exited at the channel output of RIMM 140 and is terminated at bus terminator 102.

Figure 2:
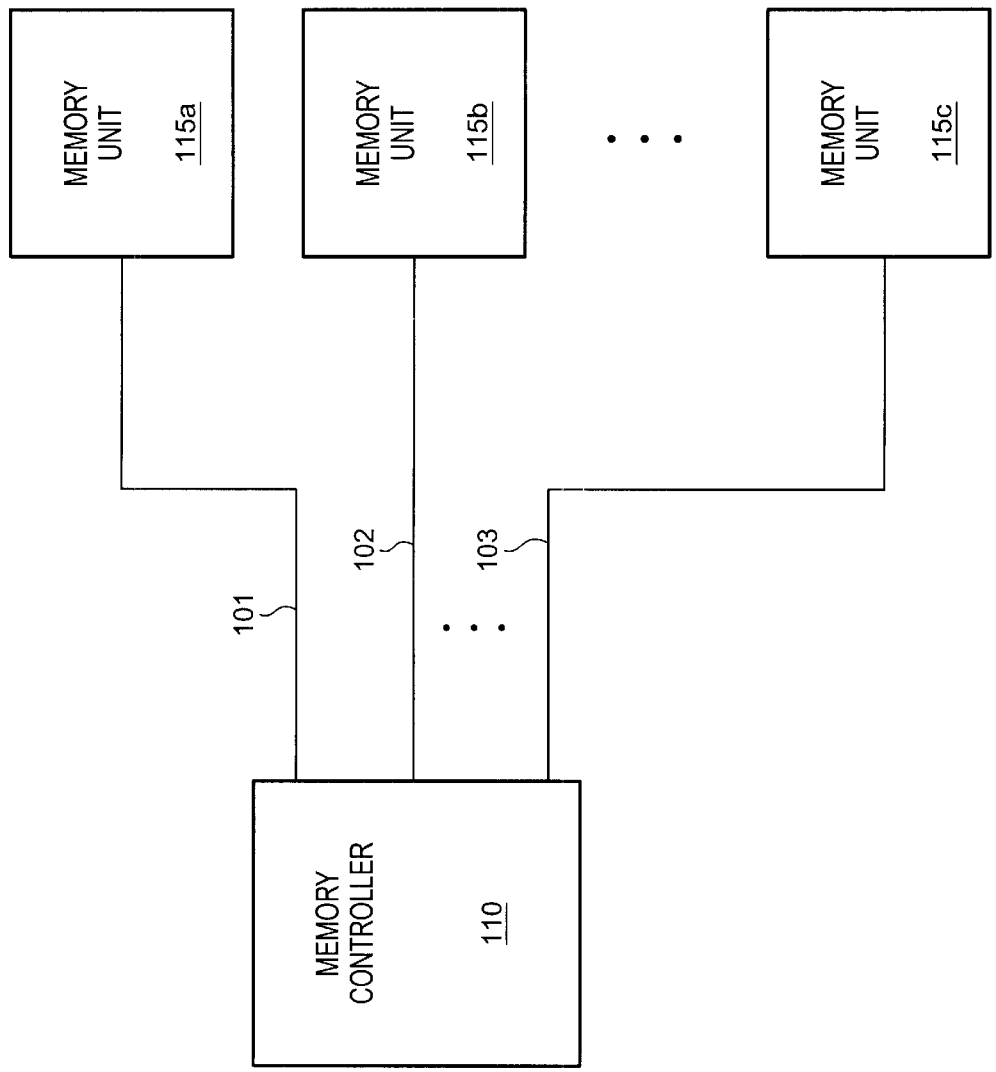
FIG. 2 is a block diagram of one embodiment of a computer system.

According to one embodiment, each of RIMMs 120, 130 and 140 includes eight (8) memory devices. Therefore, a total of twenty-four (24) memory devices are coupled to bus 101. Nevertheless, one of ordinary skill in the art will appreciate that RIMMs 120, 130 and 140 may include any number of memory devices. For example, RIMM 120 may include sixteen (16) memory devices 123, and RIMMs 130 and 140 may each include eight (8) memory devices 133 and 143, respectively. Moreover, memory controller 110 may be coupled to multiple memory units by multiple busses. For example, FIG. 2 illustrates another embodiment in which memory controller 110 may be coupled to multiple memory units 115a–115c by busses 101, 102, 103, respectively. Nevertheless, one of ordinary skill in the art will appreciate that an alternative number of memory units may be coupled to memory controller 110.

Figure 3:
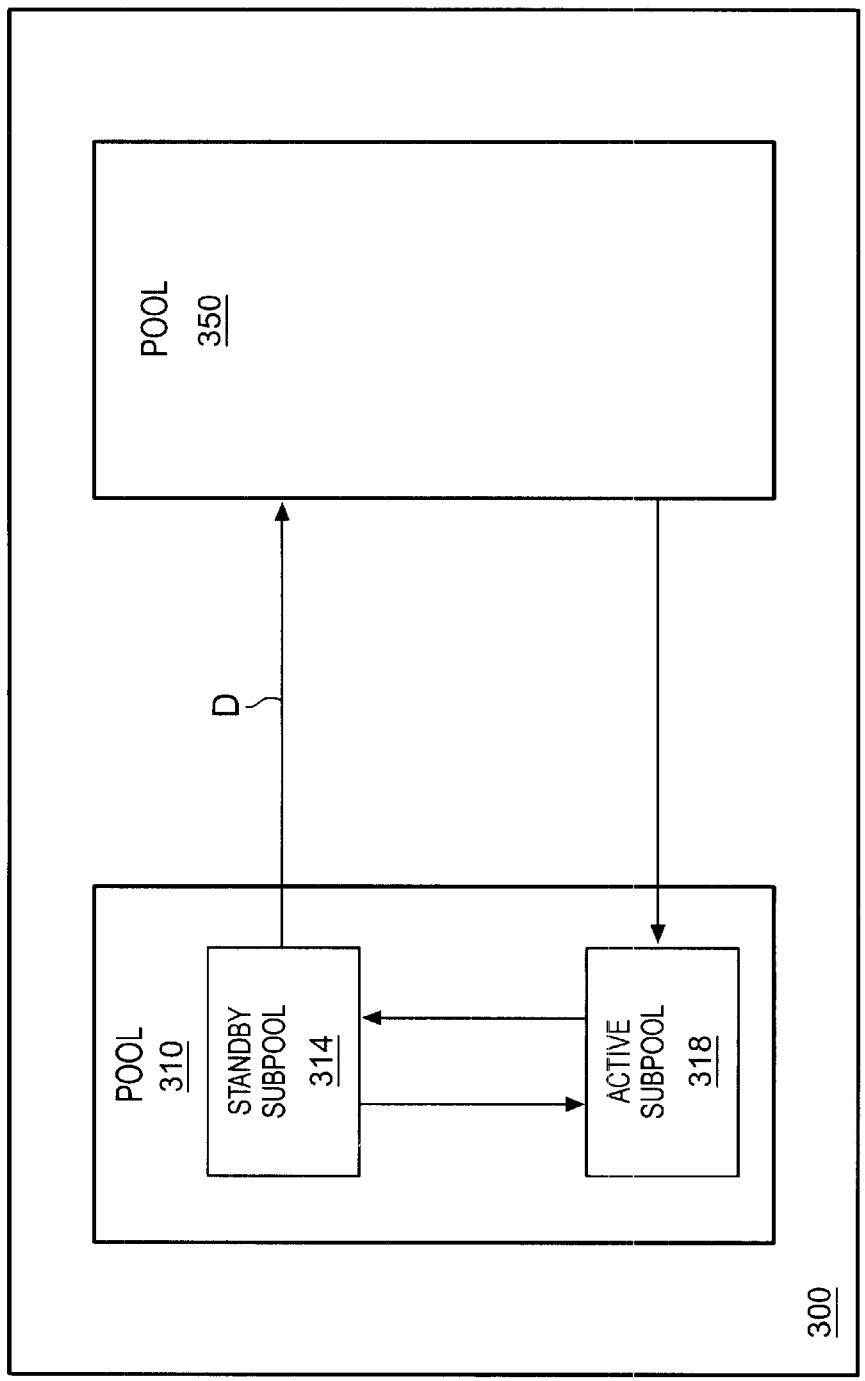
FIG. 3 is a power management module in accordance with one embodiment of the present invention.

As discussed above, each RIMM may contain multiple memory devices (e.g., 4, 8, 12, 16, etc.). If all of the memory devices on a RIMM are in the ACTIVE state, the total power generated by the RIMM will be very high (e.g., on the order of 6.4 watts). Excessive power generation may create thermal issues within the RIMM. FIG. 3 illustrates one embodiment of a power management module 300. In one embodiment power memory module 300 resides within memory controller 110 and manages the activity of memory devices 123, 133 and 143 within RIMMs 120, 130 and 140, respectively.

Power management module 300 includes device pools 310 and 350. Each of the memory devices coupled to bus 101 are logically grouped into either pool 310 or pool 350. All memory devices grouped into pool 310 are either in the ACTIVE or STANDBY state. Memory devices grouped into pool 310 are further grouped into subpools 314 and 318. All memory devices within pool 310 that are in the ACTIVE state are grouped into subpool 318. All memory devices within pool 310 that are in the STANDBY state are grouped into subpool 314.

According to one embodiment, the maximum number of memory devices that may reside in pool 310 at a time is eight (8). Additionally, a maximum of four (4) ACTIVE memory devices may reside in subpool 318 at any time. In a further embodiment, the maximum number of memory devices that may reside in pool 310 and ACTIVE devices in subpool 318 is variable and may be programmed. In such an embodiment, a user of computer system 100 may program the maximum number of memory devices that may be grouped in pool 310, as well as the amount of active devices in subpool 318. All memory devices that are not grouped into pool 310 reside in pool 350. All memory devices in pool 350 are in either the STANDBY or NAP state.

At the startup of computer system 100 all memory devices are logically grouped into pool 350. Memory devices residing in pool 350 can only enter pool 310 through subpool 318. A memory device residing in pool 350 may only enter subpool 318 when the device is accessed by a memory request from memory controller 110. Memory devices may only enter subpool 314 from subpool 318. A device may enter subpool 314 when all open rows in that device are closed (i.e., row not in ACTIVE state) and the device is put into standby state. Additionally, a memory device is moved from subpool 318 to pool 314 whenever another memory device needs to be moved from pool 350 or subpool 314 into subpool 318 and subpool 318 is filled to capacity. In this case the least recently used (LRU) device in subpool 318 is selected to be transferred to subpool 314.

A memory device residing in subpool 314 may only enter subpool 318 when the device is accessed by a memory request from memory controller 110. Memory devices may only enter pool 350 from subpool 314. A memory device enters pool 350 from subpool 314 whenever another memory device needs to be moved from subpool 318 into subpool 314 and subpool 314 is presently filled to capacity. In this case the LRU device in subpool 314 is selected to be transferred to pool 350.

According to one embodiment, a timer may be included within memory controller 110 that first moves a memory device from subpool 314 to pool 350 and subsequently moves a memory device from subpool 318 to subpool 314 if the device in subpool 318 has not been accessed in a predetermined period of time. In another embodiment, a second timer may be included solely to move memory device from subpool 314 to pool 350 if that device has not been accessed in a predetermined period of time.

Figure 4:
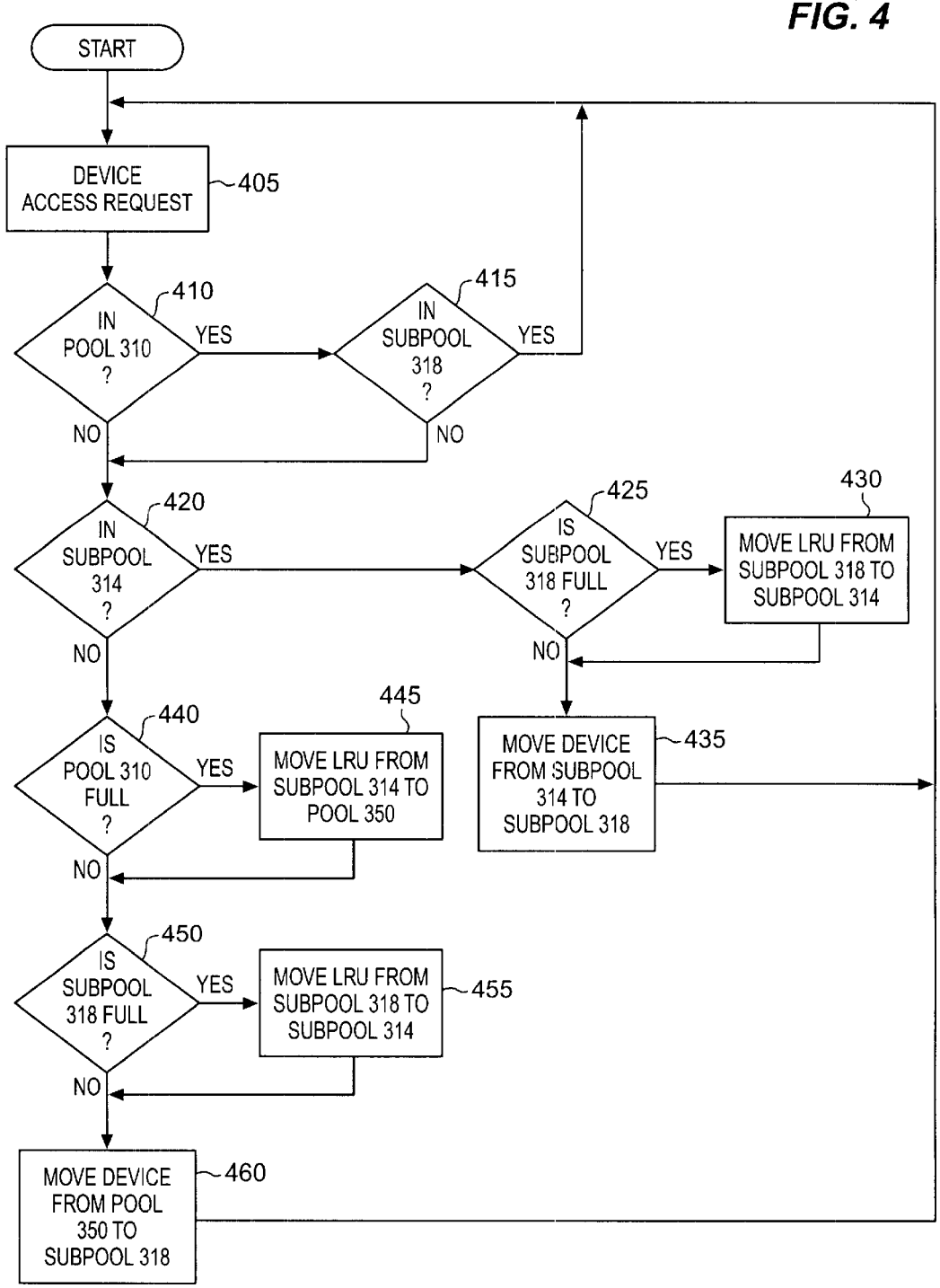
FIG. 4 is a flow diagram of the operation of power management module in accordance with one embodiment of the present invention.

FIG. 4 is a flow diagram of one embodiment of processing performed by power management module 300. At processing block 405, access to a memory device within one of the RIMMs of memory unit 115 is requested. Next, at processing block 410 it is determined whether the requested memory device resides in pool 310. If it is determined that the device resides in pool 310, it is next determined whether the memory device also resides in subpool 318, processing block 415. If the memory device does reside in subpool 318 control is returned back to processing block 405 where access to another memory device is requested. If it is determined that the memory device does not reside in pool 310, or that the device resides in pool 310 but not in subpool 318, it is determined whether the memory device resides in subpool 314, processing block 420.

If it is determined that the requested memory device resides in subpool 314, it is next determined whether subpool 318 is full, processing block 425. If subpool 318 is full, the LRU memory device of subpool 318 is logically transferred to subpool 314, processing block 430. At processing block 435, the memory device is logically moved from subpool 314 to subpool 318 and is switched to the ACTIVE state. If subpool 318 is not full, the memory device is moved directly from subpool 314 to subpool 318 and is switched to the ACTIVE state, processing block 435.

If at processing block 420 it is determined that the memory device does not reside in subpool 314, it is determined whether pool 310 is full, processing block 440. If subpool 310 is full, the LRU memory device of subpool 314 is logically transferred to pool 350, processing block 445. If subpool 310 is not full or after the LRU device has been moved from subpool 314 to pool 350, it is determined whether subpool 318 is full, processing block 450. If subpool 318 is full the LRU memory device of subpool 318 is logically transferred to subpool 314, processing block 455. At processing block 460, the memory device is logically moved from pool 350 to subpool 318 and is switched to the ACTIVE state. If subpool 318 is not full, the memory device is moved directly from pool 350 to subpool 318 and is switched to the ACTIVE state, processing block 460.

In another embodiment, the pools 310 and 350 support multiple bus (or channel) operation as shown in FIG. 2. In such an embodiment the pool logic considers the multiple channels as a single channel. For example, the definition of pool 310 is the same except that memory devices from more than one channel are included. Also, pool 350 represents channels that are either in the NAP or STANDBY states. Each memory device that is coupled to a channel in the NAP state is also in the NAP state. Similarly, each memory device coupled to a channel in the STANDBY state is also in the STANDBY state.

Figure 5:
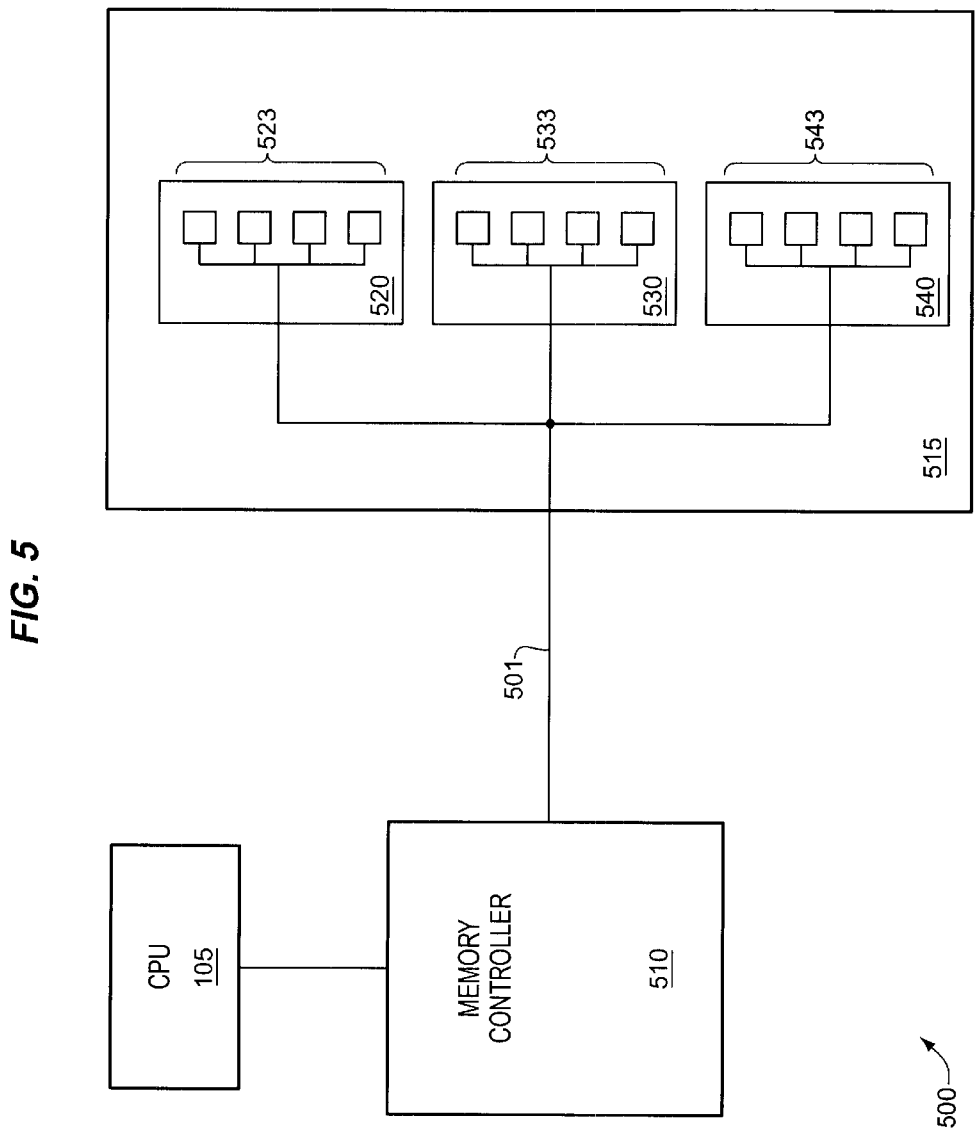
FIG. 5 is a block diagram of one embodiment of a computer system.

FIG. 5 is a block diagram of one embodiment of a computer system 500. Computer system 500 includes a bus 501, a memory controller 510, a memory unit 515 and CPU 105. As described above, CPU 105 processes information received from memory 515 or other internal and external devices of computer system 500. Memory controller 510 is coupled to CPU 105. Memory controller 510 interfaces with memory unit 515 in order to carry out memory transactions.

Memory unit 515 is coupled to memory controller 110 via bus 501. According to one embodiment, memory unit 515 is a Synchronous Dynamic Access Memory (SDRAM). An SDRAM is a form of DRAM that can be coordinated or synchronized to the clock speed of CPU 105. Bus 501 is a DRAM bus that permits memory controller 510 to communicate with memory unit 515. Bus 501 operates at speeds up to 133 MHz.

Figure 6:
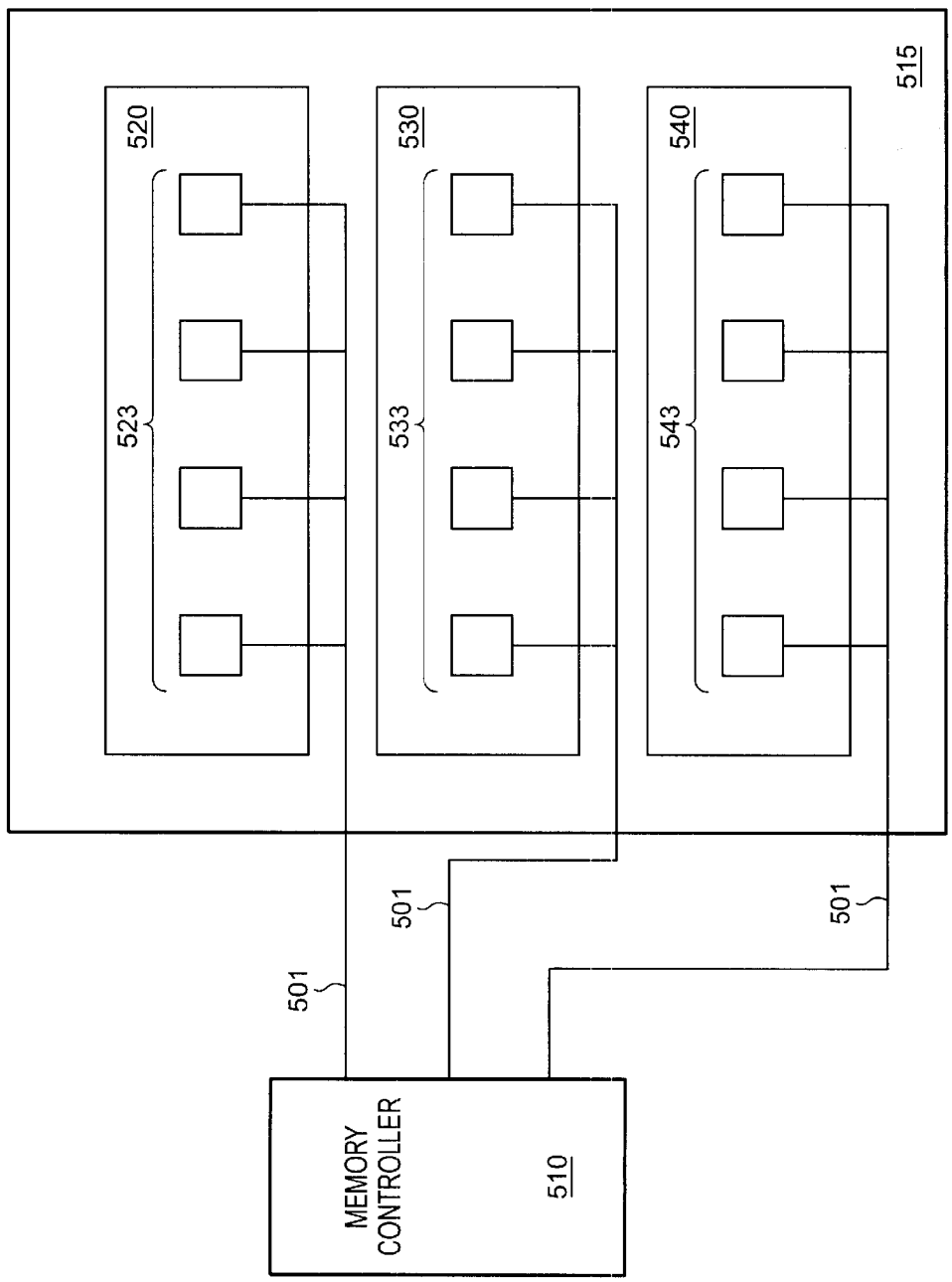
FIG. 6 is a block diagram of a logical representation of a memory controller interface in accordance with one embodiment of the present invention.

Memory unit 515 includes Dual In-line Memory Modules (DIMMs) 520, 530 and 540. DIMMs 520, 530 and 540 include memory devices 523, 533 and 543, respectively, that are accessed by CPU 105 or other devices in order to store or read data. A DIMM may include one or more rows of memory. Each row within a DIMM is coupled to memory controller 510 by bus 501. For example, FIG. 6 illustrates a logical representation of the interface between memory controller 510 and memory unit 515 wherein DIMMs 520, 530 and 540 constitute separate rows of memory devices within memory unit 515. Additionally, each row within memory unit 515 operates according to either an ACTIVE/IDLE state or POWERED DOWN state. A row is in the ACTIVE/IDLE state whenever a memory device within the DIMM is ready to transfer, or is actually transferring data. A row is in the POWERED DOWN state whenever no memory device within the row has been accessed for a long period of time.

Bus 501 is received at the input of row 520 and is coupled to each of the memory devices 523. In addition, bus 501 is received at the input of DIMM 530 and is coupled to each memory device 533. Further, bus 501 is received at that input DIMM 540 and is coupled to each memory device 543. According to one embodiment, memory unit 515 includes three rows of DIMMs (e.g., DIMMs 520, 530 and 540). However, one of ordinary skill in the art will appreciate that additional DIMMs may be added to memory unit 515.

According to a further embodiment, each of the DIMMs includes four (4) memory devices. Therefore, four memory devices are included in each row coupled to bus 501. Nevertheless, one of ordinary skill in the art will appreciate that DIMMs 520, 530 and 540 may each include a different number of memory devices, as well as different combinations. For example, DIMM 520 may include sixteen (16) memory devices 523 and DIMMs 530 and 540 may each include eight (8) memory devices 533 and 543, respectively.

Figure 7:
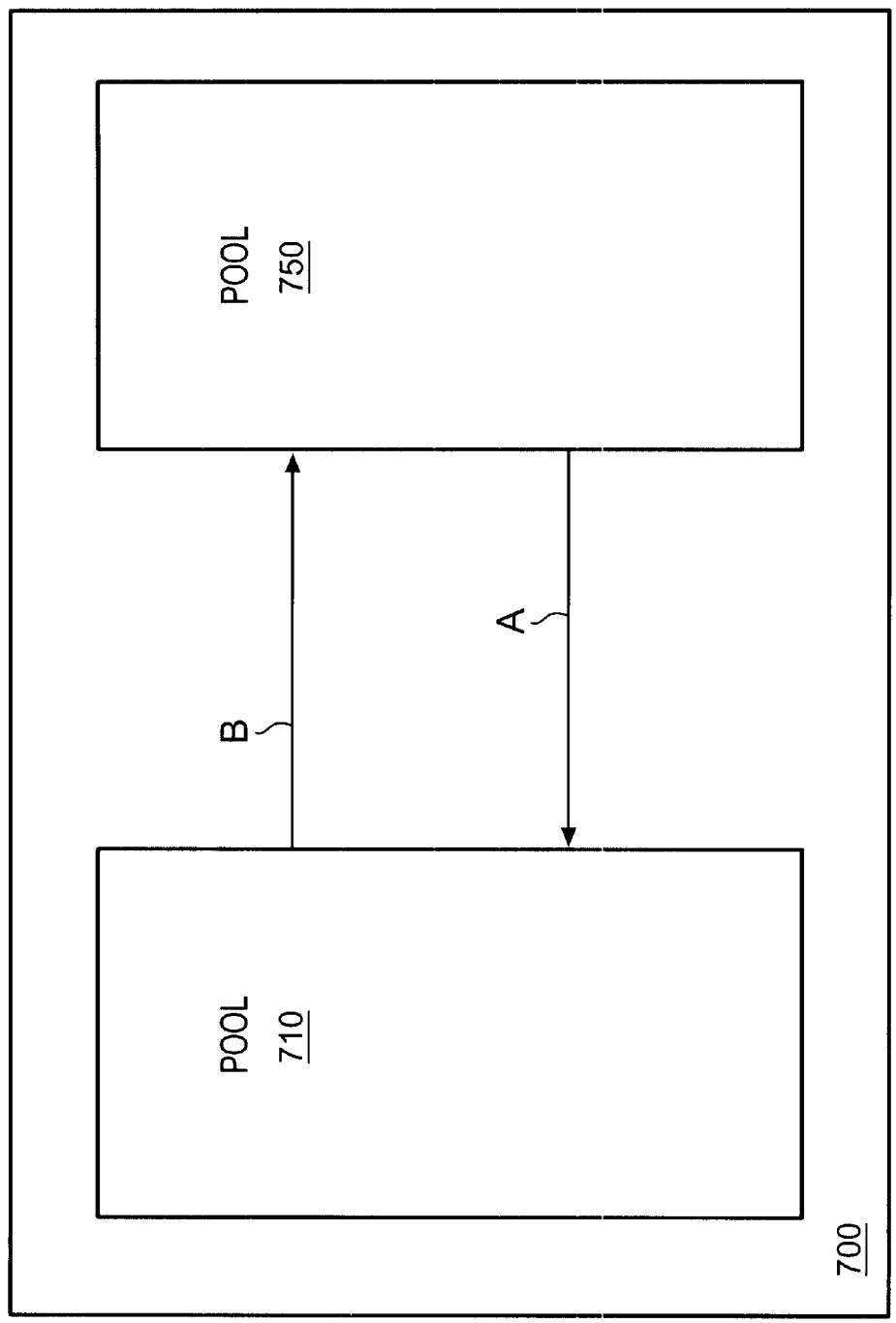
FIG. 7 is a power management module in accordance with one embodiment of the present invention.

As discussed above with respect to memory unit 115, the total power generated by a DIMM will be very high if all of the memory devices are in the ACTIVE/IDLE state. FIG. 7 illustrates a power management module 700. Power memory module 700 resides within memory controller 510 and manages the activity of DIMMs 520, 530 and 540.

Power management module 700 includes device pools 710 and 750. Each of the memory device rows coupled to bus 501 are grouped into either pool 710 or pool 750. All rows that are grouped within pool 710 are in the ACTIVE/IDLE state. All rows that do not reside in pool 710 are grouped within pool 750. Thus, all rows that are in the POWERED DOWN state reside in pool 750. According to one embodiment, only one (1) row may reside in pool 710 at a time. However, the maximum number of rows that may reside in pool 710 may be programmed. In such an embodiment, a user of computer system 500 may program the maximum number of memory devices that may be grouped in pool 710.

At the startup of computer system 500 all rows are logically arranged into pool 750. A row residing in pool 750 may only enter pool 710 when a memory device within the row is accessed by a memory request from memory controller 510. Additionally, a row is moved to pool 750 from pool 710 whenever another row needs to be moved from pool 750 into pool 710 and pool 710 is filled to capacity. In this case the LRU device in pool 710 is selected to be transferred to pool 750. Before the row is moved to pool 750 all open pages must first be closed. According to one embodiment, a timer is included within memory controller 510 that moves a row from pool 710 to pool 750 if a memory device within the row has not been accessed in a predetermined period of time.

Figure 8:
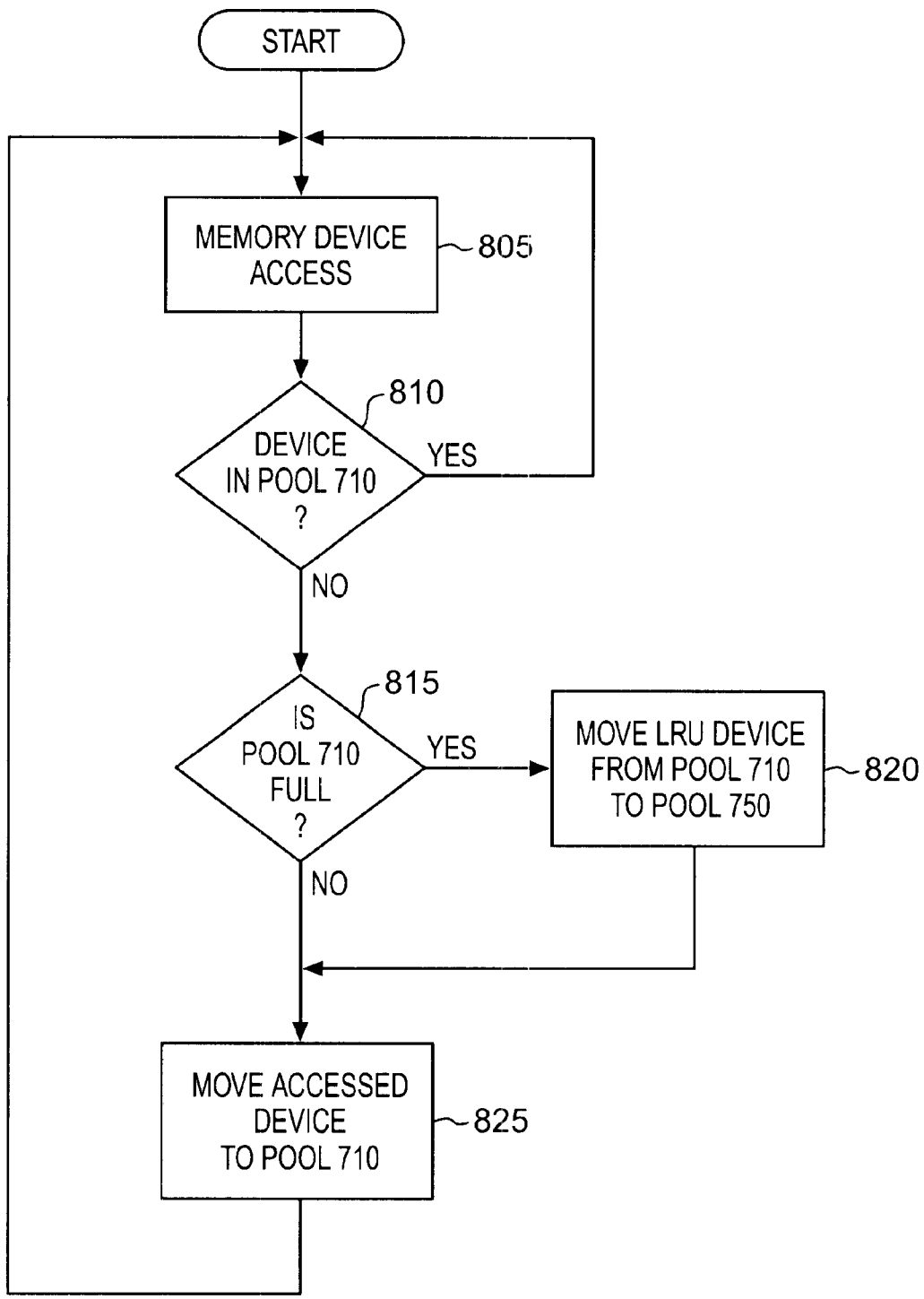
FIG. 8 is a flow diagram of the operation of one embodiment of a power management module.

FIG. 8 is a flow diagram of one embodiment with a process performed by power management module 700. At process block 705, access to a memory device within one of the rows of memory unit 515 is requested. Next, at process block 710 it is determined at memory controller 510 whether the DIMM resides in pool 710. If it is determined that the row resides in pool 710, control is returned back to process block 805 wherein access to another memory device is requested. If it is determined that the row does not reside in pool 710, it is determined whether pool 710 is full, process block 815.

If pool 710 is full the LRU row in pool 710 is logically transferred to pool 750, process block 820. At process block 825, the requested row is logically moved from pool 750 to pool 710 and is switched to the ACTIVE/IDLE state. If pool 710 is not full the row is moved directly from pool 750 to pool 710 and is switched to the ACTIVE/IDLE state, process block 825. One of ordinary skill in the art will appreciate that the present invention may be implemented in other memory systems, such as Sync Link DRAMS (SLDRAMS), EDO DRAMS etc.

Thus a method and apparatus for memory power management has been described

What is claimed is:

1. A power management method comprising:
   requesting access to a first memory in a first row of a plurality of rows in a Synchronous Dynamic Random Access Memory (SDRAM) system, each row comprising a plurality of memory devices, wherein each of said plurality of rows is classified as belonging to a first group or a second group, wherein said first group is associated with a first power state and said second group is associated with a second power state;
   determining if said first row is classified as belonging to said first group; if not
   determining if said first group is filled to capacity; and, if not
   classifying said first row as belonging to said first group.

2. The method of claim 1 further comprising classifying a second row as belonging to the second group if the first group is filled to capacity.

3. The method of claim 1, wherein the first power state is an active power state and the second power state is a powered down state.

4. The method of claim 1 further comprising:
   classifying a second row classified as belonging to the first group as belonging to the second group if the second row has not been accessed in a predetermined interval of time.

5. The method of claim 2, wherein the second row is the least recently used in the first group.

6. The method of claim 2, wherein the capacity of the first group is programmable.

7. A computer system comprising:
   a memory system including a plurality of rows, wherein each row includes a plurality of memory devices, and wherein the memory devices in each of the plurality of rows operate according to a first power state, a second power state or a third power state; and
   a memory controller to manage the power of the plurality of memory devices by identifying rows of memory devices operating in the first power state as belonging to a first group and identifying rows of memory devices operating in the second power state as belonging to a second group.

8. The computer system of claim 7, wherein the first group is subdivided into a first subgroup and a second subgroup, wherein rows of memory devices belonging to the first group that are in the first power state are identified as belonging to the first subgroup and rows of memory devices belonging to the first group that are in the second power state are identified as belonging to the second subgroup.

9. The computer system of claim 7, wherein the plurality of memory devices are Rambus Dynamic Random Access Memories (RDRAMs).

10. The computer system of claim 7, wherein the first power state is an active state and the second power state is a nap state.

11. The computer system of claim 8, wherein a first row of memory devices identified as belonging to the second group becomes identified as belonging to the first group upon being accessed by the memory controller.

12. The computer system of claim 11, wherein a second row of memory devices identified as belonging to the first group becomes identified as belonging to the second group if the first group is filled to capacity.

13. The computer system of claim 11, wherein a second row of memory devices identified as belonging to the second subgroup becomes identified as belonging to the second group and a third row of memory devices identified as belonging to the first group becomes identified as belonging to the second group if the first group is filled to capacity.

14. The computer system of claim 11, wherein the memory controller further comprises a timer to identify the first row of memory devices as belonging to the second group if the first row of memory devices has not been accessed by the memory controller within a predetermined period of time while the first row of memory devices is identified as belonging to the first group.

15. The computer system of claim 11, wherein the memory controller further comprises a timer to identify the first row of memory devices as belonging to the second group and to identify a second row of memory devices as belonging to the second subgroup if the first memory device has not been accessed by the memory controller within a predetermined period of time while the first memory device is identified as belonging to the second subgroup.

16. The computer system of claim 12, wherein the capacity of the first group is programmable.

17. The computer system of claim 13, wherein the capacity of the first subgroup is programmable.

18. A power management method comprising:
   requesting access to a first memory device of a plurality of memory devices in a memory system, wherein each one of said plurality of memory devices is classified as belonging to a first group or second group, wherein said first group is associated with a first power state and said second group is associated with a second power state;
   determining if said first memory device is classified as belonging to said first group; if not
   determining if said first group is filled to capacity; and, if not
   classifying said first memory device as belonging to said first group.

19. The method of claim 18, wherein each of said plurality of memory devices classified as belonging to said first group is further classified as belonging to a first subgroup or a second subgroup.

20. The method of claim 19 further comprising:
   determining if said first memory device is classified as belonging to said first subgroup if said first memory device is classified as belonging to said first group; and, if not
   determining if said first memory device is classified as belonging to said second subgroup.

21. The method of claim 19 further comprising:
   classifying a second memory device classified as belonging to said second subgroup as belonging to said second group if said first group is filled to capacity;
   determining if said first subgroup is filled to capacity; and
   classifying a third memory device classified as belonging to said first subgroup as belonging to said second subgroup.

22. The method of claim 19, further comprising:
   determining if said first subgroup is filled to capacity if said first group is filled to capacity; and
   classifying a second memory device classified as belonging to said first subgroup as belonging to second subgroup.

23. The method of claim 19, wherein memory devices classified as belonging to said first subgroup are in an active state and memory devices classified as belonging to said second subgroup are in a standby state.

24. The method of claim 19, wherein the first power state is an active state and the second power state is a nap state.

25. The method of claim 19 further comprising:
   classifying a second memory device classified as belonging to said second subgroup as belonging to said second group if said second memory device has not been accessed within a predetermined interval of time.

26. The method of claim 19 further comprising:
   classifying a second memory device classified as belonging to said second subgroup as belonging to said second group if said second memory device has not been accessed within a predetermined interval of time; and
   classifying a third memory device classified as belonging to said first subgroup as belonging to said second subgroup if said third memory device has not been accessed within said predetermined interval of time.

27. The method of claim 19 wherein the memory system is a Rambus Dynamic Random Access Memory (RDRAM).

28. The method of claim 20 further comprising:

determining if said first subgroup is filled to capacity if said first memory device is classified as belonging to said second subgroup; and, if not classifying said first memory device as belonging to said first subgroup.

29. The method of claim 21, wherein the capacity of said first group and said first subgroup is programmable.

30. The method of claim 21, wherein said second memory device is the least recently used memory device classified in said first group and said third memory device is the least recently used memory device classified in said first subgroup.

31. The method of claim 28 further comprising:

transferring a second memory device classified as belonging to said first subgroup to said second subgroup if said first subgroup is filled to capacity.

32. The method of claim 31 wherein said second memory device is the least recently used memory device classified as belonging to the first subgroup.

* * * * *